United States Patent Office 2,758,498
Patented Aug. 14, 1956

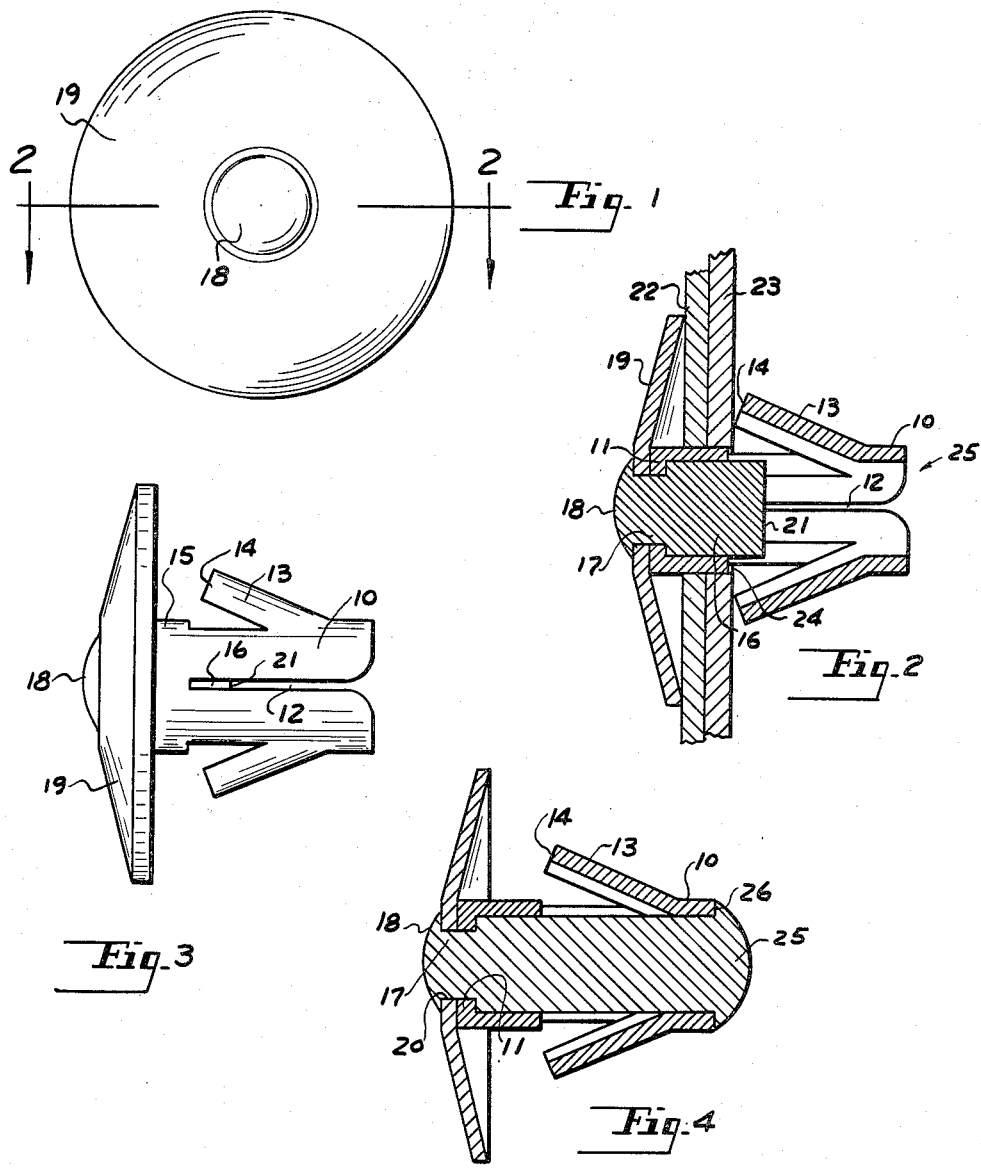

2,758,498

THREADLESS SNAP FASTENER WITH SOLID REINFORCING CORE THEREIN

Clyde F. Johnson, Detroit, Mich., assignor to Speed Stud Corporation, Centerline, Mich., a corporation of Michigan Application December 17, 1953, Serial No. 398,778

2 Claims. (Cl. 85—5)

The fastener is adapted for use in joining such items as sheet metal objects or plates, the fastener being used in the manner of a rivet or bolt. However, the object of the invention is to provide a fastener which, once thrust through the alined holes in the respective sheet items, will automatically join said items firmly and securely without the need of any additional operation.

The fastener is made in part of sheet metal stock, which feature has already been considerably developed. However, fasteners of this type are not particularly adapted to withstand any substantial shearing force when the sheets joined by the fasteners are subjected to stresses in opposite directions but transversely to the axis of the respective fastener. It was, therefore, the object of my improvement to design a fastener which by reason of a combination of elements shown by me will have a materially higher strength than other fasteners having shanks of approximately the same diameter.

A further object of the improvement is to provide a fastener including radial, resilient members adapted to be compressed while the fastener is thrust through the alined holes in the sheets to be joined, but which, upon having passed through the holes, will snap outwardly to prevent the withdrawal of the fastener by a pull reverse to the direction of said thrust.

A further object of the improvement is to provide a fastener which will be easy to produce in quantity, which will be low in cost, and which will be fully practical and useful for the purposes for which it may be adapted.

I shall now describe the fastener with respect to the accompanying drawing in which:

Fig. 1 is a top view of the fastener;

Fig. 2 is a longitudinal section view thereof;

Fig. 3 is a side elevational view of said fastener;

Fig. 4 is a longitudinal sectional view of a modified species of the fastener.

Similar numerals refer to similar parts throughout the several views.

The body portion of the fastener is made of suitable steel stock and has the form of a cylinder 10. At one end, which I shall call the front end, the cylinder includes an inwardly-turned rim portion forming an annular flange 11. Beginning at an imaginary annular line paced from the front end of the cylinder, its wall is provided with two diametrically-opposed longitudinal slots 12. Integrally connected with and formed out of the body portion of the cylinder, by being partly severed therefrom, are a plurality of radial prongs 13. The prongs rise at an angle from the body of the cylinder and flare outwardly therefrom, the end portions 14 of the prongs facing the front end of the fastener.

As the body of the cylinder is made of resilient material such as spring steel, the prongs will be adapted to be depressed temporarily towards the axis of the cylinder, as when the shank portion of the fastener, already identified as said cylinder 10, should be pushed through a hole.

Disposed within the cylinder, specifically, at the front end 15 thereof, is a solid metal core 16. The core includes a neck portion 17 of restricted diameter to fit into the opening defined by the annular flange 11 and an outwardly-extending axial member 18 to which I shall presently refer. Axially mounted upon said neck portion 17 of the core is a circular, dish-like member 19, preferably made of resilient metal stock. The member is provided with an axial aperture 20 and forms, with the aforesaid member 18, the head of the fastener.

Initially said member 18 is of the same diameter as the neck 17 of the core, but in the course of the construction of the fastener is deformed into a cap, the marginal portion of which extends radially beyond the limits of aperture 20 of the disk-like member 19. It will be noted that the rear end 21 of the core extends approximately only to the mid-length of the cylinder.

Assuming now that two sheet metal items or two plates, marked 22 and 23, respectively, are to be joined together, the plates being in a parallel abutment with each other and being provided with alined holes 24 for each fastener, the fastener is thrust into said holes. This is done in such a manner that the rear end of the fastener enters the holes first. The operation results in a temporary compression of the free ends of the prongs towards the axis of the cylinder 10 till said prongs have fully passed through said holes, whereupon, by reason of their own resiliency, the prongs expand so that their free ends 14 bear against the outer face of the adjoining plate 23. It will be noted that said ends 14 are disposed at points radially beyond the rim of the hole 24 in said plate, as shown in Fig. 2.

As the dish-like member 19 is preferably of a resilient quality, it may flex temporarily towards the adjoining plate 22 while the pressure is applied to said member 19 in the course of the thrust of the fastener as above described. On discontinuance of the pressure, said member 19 will automatically tend to resume its initial position as far as permitted by the prongs 13 from the opposite end of the fastener. Thus, the member 19 and the prongs serve to press the plates towards each other from opposite directions.

Once the fastener is in place the core 16 will serve to reinforce the wall of the shank against shearing by the individual plates 23 and 24 in directions crosswise to the axis of the fastener.

The modified fastener shown in Fig. 4 includes a longer core, having an approximately semi-spherical end portion 25, the marginal part of which covers the edge 26 of the wall of said cylinder 10. The rounded end of the core is intended to facilitate the insertion of the fastener into the holes in the respective items to be joined thereby.

It will be understood that other changes may be made in the fastener without departing from the inventive concept disclosed herein.

What I, therefore, wish to claim is as follows:

1. A snap fastener comprising a sheet metal shank in the form of a cylinder having at one end an inwardly-turned flange and having in its wall a plurality of longitudinal slots, a solid cylindrical core within the shank and including a neck of restricted diameter and extending through the flanged end of the shank outwardly, a dished-in circular head having a central aperture and axially mounted upon the neck portion, said neck being deformed at its outer end to join the head to the shank, the opposite end of the core extending to a line approximately midway the length of the shank, the wall of said shank including portions partly cut out and forming outwardly-flaring, resilient prongs having free ends facing said head.

2. A snap fastener comprising a circular head dished-in on one side and having an axial aperture therein, a shank made of resilient sheet metal and having the form of a cylinder provided with an inwardly-turned annular flange at the end adjoining said head, a solid cylindrical core within the shank, the core including a neck of restricted diameter for passage through the flanged end of the shank and through the aperture in the head and serving, by being deformed at its outer end, as a means of securing the head to the shank the opposite end of the core extending to a line spaced from the end of the shank, which head is remote from the head of the fastener, the wall of the cylinder being slotted longitudinally and including a plurality of resilient prongs integrally formed out of partly severed portions of the wall, the prongs flaring outwardly from the wall and including free ends facing the head.

References Cited in the file of this patent
UNITED STATES PATENTS

| | | |
|---|---|---|
| 861,573 | Budd | July 30, 1907 |
| 1,269,411 | Edwards | June 11, 1918 |
| 2,041,336 | Hall | May 19, 1936 |
| 2,195,029 | Hathorn | Mar. 26, 1940 |
| 2,438,499 | Hartman | Mar. 30, 1948 |
| 2,537,786 | Poupitch | Jan. 9, 1951 |
| 2,560,530 | Burdick | July 10, 1951 |
| 2,650,516 | Poupitch | Sept. 1, 1953 |